United States Patent
Huang et al.

(10) Patent No.: US 7,629,924 B2
(45) Date of Patent: Dec. 8, 2009

(54) METHODS AND APPARATUS FOR OBTAINING ACCURATE GNSS TIME IN A GNSS RECEIVER

(75) Inventors: Kung-Shuan Huang, Changhua County (TW); Ming-Hung Li, Taichung County (TW)

(73) Assignee: Mediatek Inc., Hsin-Chu (TW)

( * ) Notice: Subject to any disclaimer, the term of this patent is extended or adjusted under 35 U.S.C. 154(b) by 306 days.

(21) Appl. No.: 11/850,684

(22) Filed: Sep. 6, 2007

(65) Prior Publication Data

US 2009/0066567 A1 Mar. 12, 2009

(51) Int. Cl.
*G01S 1/00* (2006.01)
*G01C 21/00* (2006.01)

(52) U.S. Cl. .................................. 342/357.02; 701/215
(58) Field of Classification Search ............ 342/357.02; 701/215
See application file for complete search history.

(56) References Cited

U.S. PATENT DOCUMENTS

| | | | |
|---|---|---|---|
| 6,138,074 A * | 10/2000 | Gower et al. ................. 701/215 |
| 6,662,107 B2 | 12/2003 | Gronemeyer | |
| 6,778,136 B2 | 8/2004 | GroneMeyer | |
| 6,788,655 B1 | 9/2004 | Underbrink | |
| 6,907,346 B2 * | 6/2005 | Teranishi et al. ............ 701/213 |
| 6,931,233 B1 | 8/2005 | Tso | |
| 6,985,811 B2 | 1/2006 | Gronemeyer | |
| 7,019,689 B1 | 3/2006 | McBurney et al. | |
| 7,047,023 B1 | 5/2006 | Tso | |
| 7,123,190 B1 | 10/2006 | McBurney et al. | |
| 7,190,307 B2 | 3/2007 | Gronemeyer | |
| 7,348,921 B2 | 3/2008 | Yu | |
| 7,466,265 B1 | 12/2008 | Huang | |
| 7,471,717 B2 * | 12/2008 | Huang ........................ 375/150 |
| 7,579,984 B2 * | 8/2009 | Wang et al. ............ 342/357.12 |
| 2006/0047459 A1 | 3/2006 | Underbrink | |
| 2007/0268180 A1 | 11/2007 | Zhi | |
| 2009/0066567 A1 | 3/2009 | Huang | |

FOREIGN PATENT DOCUMENTS

CN 101382589 A 3/2009

OTHER PUBLICATIONS

International application No: PCT/CN2008/073848, International filing date: Dec. 30, 2008, International Searching Report mailing date: Sep. 17, 2009.

* cited by examiner

*Primary Examiner*—Thomas H Tarcza
*Assistant Examiner*—Harry Liu
(74) *Attorney, Agent, or Firm*—Winston Hsu

(57) ABSTRACT

A method for obtaining GNSS time in a GNSS receiver includes: deriving a relationship between a first clock signal and the received GNSS time; latching a second clock signal and the first clock signal at a first latching point to obtain a clock value A1 of the first clock signal and a clock value B1 of the second clock signal; calculating a GNSS time C1 corresponding to the clock value A1 according to the relationship; latching the first clock signal and the second clock signal at a second latching point to obtain a clock value A2 of the first clock signal and a clock value B2 of the second clock signal; and calculating a GNSS time C2 corresponding to the clock value A2 according to the GNSS time C1, the clock value B1, and the clock value B2. For example, the aforementioned values A1, B1, C1, B2, and C2 represent values such as TTick1, RTC1, TOW1, RTC2, and TOW2, respectively.

20 Claims, 5 Drawing Sheets

| Power off period (sec) | 1 | 10 | 60 | 600 | 3600 |
|---|---|---|---|---|---|
| Initial GNSS Time Error ($\mu$sec) | <1 | <1 | <1 | 1.93 | 21.5 |
| RTC drift value before power off period ($\mu$sec/sec) | -6.82 | -6.84 | -6.87 | -6.87 | -6.86 |
| RTC drift value after power off period ($\mu$sec/sec) | -6.86 | -6.82 | -6.90 | -6.83 | -6.85 |

FIG. 5

METHODS AND APPARATUS FOR OBTAINING ACCURATE GNSS TIME IN A GNSS RECEIVER

BACKGROUND

The present invention relates to Global Navigation Satellite System (GNSS) receivers, and more particularly, to methods and apparatus for obtaining accurate GNSS time in a GNSS receiver.

One of the most important issues related to GNSS receivers is how to obtain accurate GNSS time when a GNSS receiver enters a start up mode from a power-off mode. Typically, within the GNSS receiver, all components except a real time clock (RTC) are powered down in the power-off mode. According to the related art, a common way to get an initial GNSS time when the GNSS receiver is powered on is by reading the RTC time provided by the RTC as the Coordinated Universal Time, which is referred to as the UTC time, and by further converting the UTC time derived from the RTC time into a rough initial value of the GNSS time directly. Thus, some problems are introduced when implementing according to the related art. For example, UTC leap seconds are unknown. In addition, the cycle of the RTC is typically around several microseconds and the resolution of the RTC is typically around several tens to several hundreds parts per million (PPM), causing the aforementioned initial value of the GNSS time to be unacceptable. Additionally, during time synchronization between the RTC time and real GNSS time, a time delay typically exists, causing the aforementioned initial value of the GNSS time to be inaccurate.

SUMMARY

An exemplary embodiment of a method for obtaining GNSS time in a GNSS receiver comprises: deriving a relationship between a first clock signal and the received GNSS time; latching a second clock signal and the first clock signal at a first latching point to obtain a clock value A1 of the first clock signal and a clock value B1 of the second clock signal; calculating a GNSS time C1 corresponding to the clock value A1 according to the relationship; latching the first clock signal and the second clock signal at a second latching point to obtain a clock value A2 of the first clock signal and a clock value B2 of the second clock signal; and calculating a GNSS time C2 corresponding to the clock value A2 according to the GNSS time C1, the clock value B1, and the clock value B2. More particularly, in this embodiment, the aforementioned values A1, B1, C1, B2, and C2 represent values TTick1, RTC1, TOW1, RTC2, and TOW2, respectively.

An exemplary embodiment of an apparatus for obtaining GNSS time in a GNSS receiver comprises: a first clock source for generating a first clock signal; a real time clock (RTC) for generating a second clock signal; a time-latching logic circuit, coupled to the first clock source and the RTC, for performing a time-latching operation to latch the first clock signal and the second clock signal at a first latching point in order to obtain a clock value A1 of the first clock signal and a clock value B2 of the second clock signal, and further latching the first clock signal and the second clock signal at a second latching point to obtain a clock value B2 of the second clock signal; and a processing module, coupled to the first clock source, the RTC, and the time-latching logic circuit, for deriving a relationship between the first clock signal and the GNSS time, calculating a GNSS time C1 corresponding to the clock value A1 according to the relationship, and calculating a GNSS time C2 corresponding to the clock value B2 according to the GNSS time C1 and the clock values B1 and B2. More particularly, in this embodiment, the aforementioned values A1, B1, C1, B2, and C2 represent values TTick1, RTC1, TOW1, RTC2, and TOW2, respectively.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 illustrates some experimental results derived by utilizing the method shown in FIG. 2.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
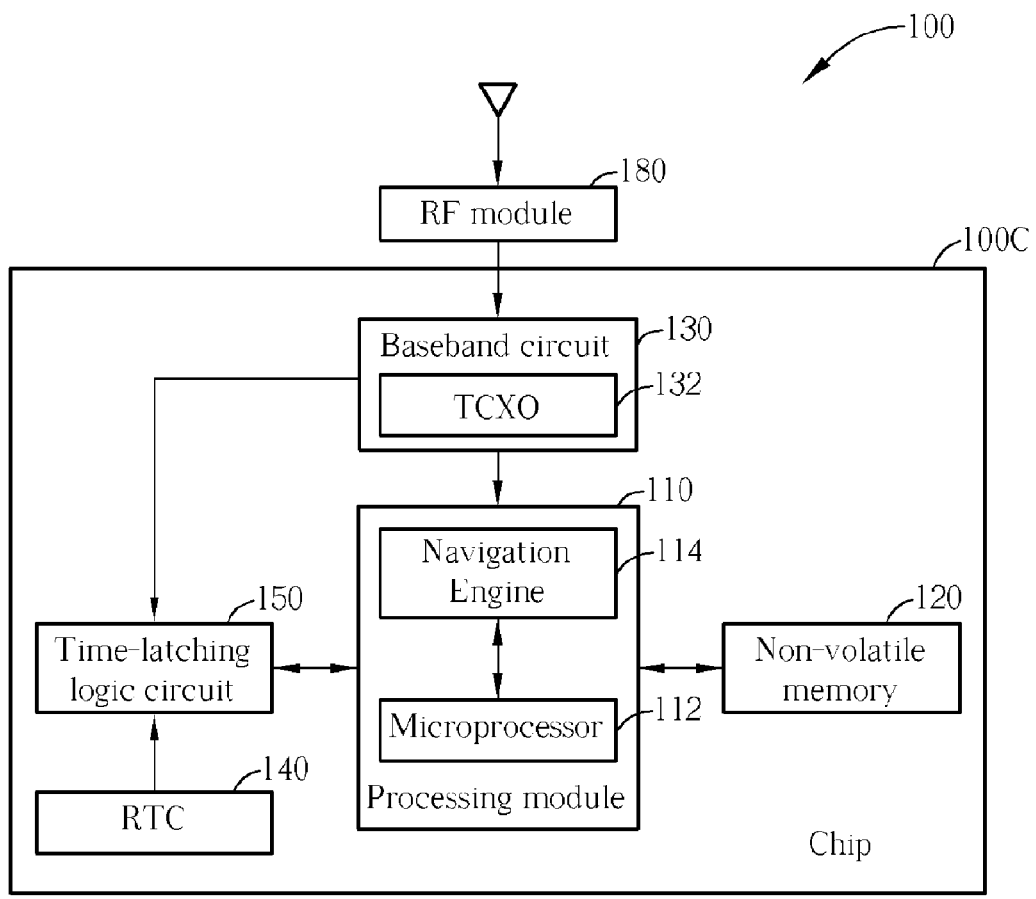
FIG. 1 is a diagram of an apparatus for obtaining accurate GNSS time in a GNSS receiver according to a first embodiment of the present invention.

Please refer to FIG. 1. FIG. 1 is a diagram of an apparatus 100 for obtaining accurate GNSS time in a GNSS receiver according to a first embodiment of the present invention. The apparatus 100 comprises a processing module 110, a non-volatile memory 120, a baseband circuit 130, a real time clock (RTC) 140, and a time-latching logic circuit, which are implemented with a chip 100C coupled to a radio frequency (RF) module 180. The apparatus 100 may represent the GNSS receiver in one embodiment of the present invention. In another embodiment of the present invention, the apparatus 100 may represent a portion of the GNSS receiver, for example, the chip 100C. In another embodiment of the present invention, the apparatus 100 may comprise the GNSS receiver. For example, the apparatus 100 can be a multi-function device comprising the cellular phone function, the personal digital assistant (PDA) function, and the GNSS receiver function.

According to the first embodiment, the baseband circuit 130 is capable of utilizing the RF module 180 to receive signals from GNSS satellites and further performing baseband processing according to derivative signals generated by the RF module 180. The processing module 110 of this embodiment comprises a microprocessor 112 and a navigation engine 114, where the microprocessor 112 is capable of performing overall control of the apparatus 100, while the navigation engine 114 is capable of performing detailed navigation operations according to processing results from the baseband circuit 130.

The baseband circuit 130 is operated in a first clock signal such as a baseband time tick (TTick) whose frequency is typically around 10 MHz, where the baseband time tick is generated from a first clock source typically implemented with a temperature compensated crystal oscillator TCXO 132 within the baseband circuit 130. The RTC 140 is a second clock source and remains powered during a power-off period. The resolution of a second clock signal generated from the second clock source (i.e. the RTC 140 in this embodiment) is relatively low, where the second clock signal of this embodiment is an oscillator signal of the RTC 140, and the frequency of the oscillator signal is typically around 32768 Hz. The GNSS receiver always has to derive accurate time information in order to process the satellite signal. After each time of position fix, the processing module 110 derives time information by utilizing a baseband time tick value (a clock value of the first clock signal) according to the relationship between the baseband time tick and GNSS time. But when the GNSS receiver is waked up from a power off mode, the relationship is no longer suitable; the GNSS receiver needs another source to get the accurate GNSS time. The processing module 110 of this embodiment derives time information corresponding to sufficient resolution and accuracy by adopting the time-latching logic circuit 150. The time-latching logic circuit 150 is capable of performing a time-latching operation to read an RTC value of the RTC and a time tick value of the baseband time tick at the same latching point.

Figure 2:
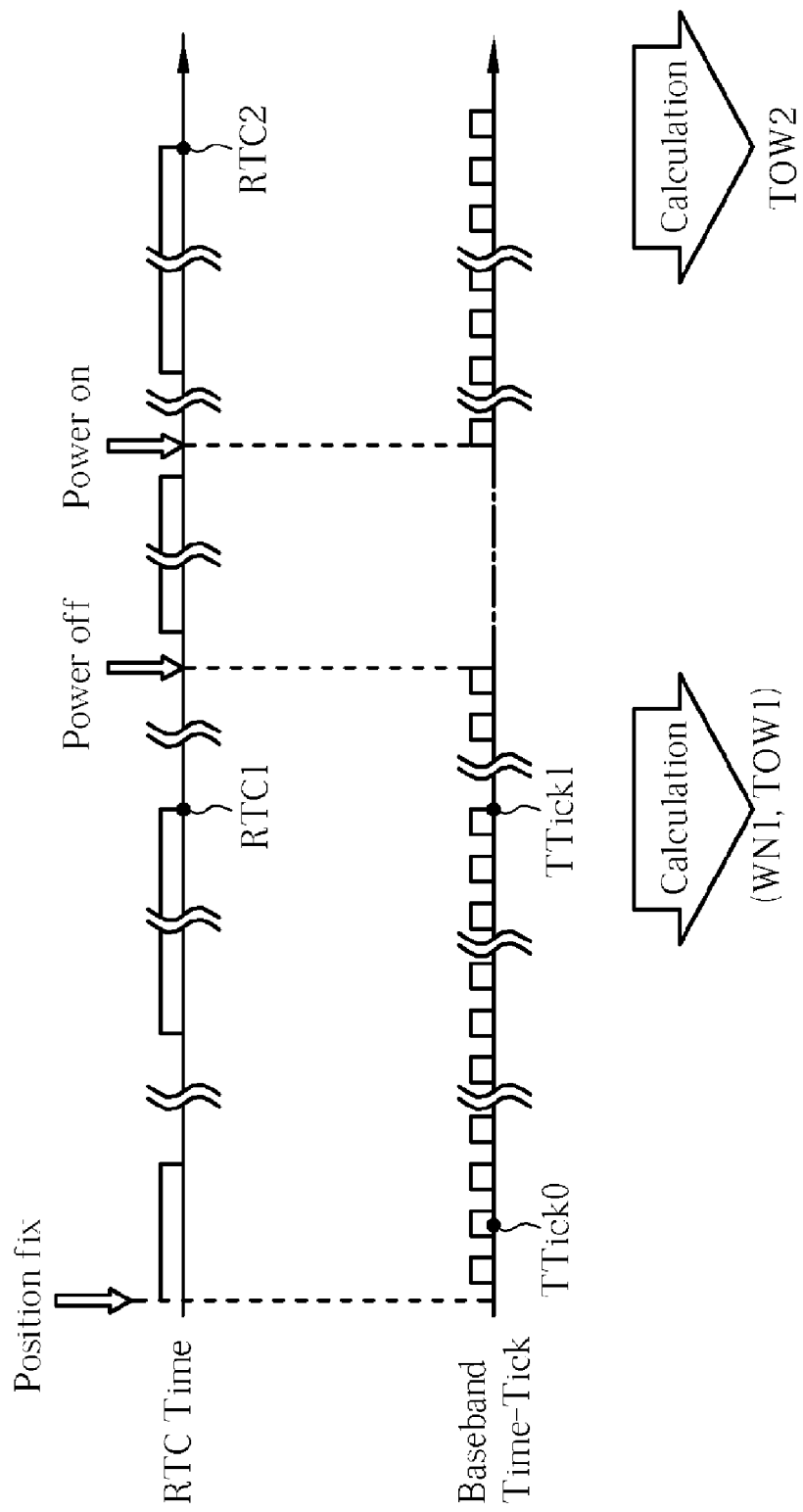
FIG. 2 illustrates a method for obtaining accurate GNSS time in a GNSS receiver according to one embodiment of the present invention.

FIG. 2 illustrates a method for obtaining accurate GNSS time in a GNSS receiver according to one embodiment of the present invention. The method shown in FIG. 2 can be implemented by utilizing the apparatus 100 shown in FIG. 1. Referring to the left portion of FIG. 2, after the GNSS receiver obtains a position fix, the processing module 110 of this embodiment derives the relationship between the first clock signal (the baseband time tick) and the GNSS time. The time-latching logic circuit 150 latches the two clock signals, the baseband time tick and the RTC clock signal, and then gets a set of clock values (A1, B1) at the time latching point. A1 is the clock value of the baseband time tick, and B1 is the clock value of the RTC signal, at the same latching point. The processing module 110 then derives a GNSS time C1 corresponding to the clock value A1 according to the relationship. In addition, after each position fix is obtained, the processing module 110 of this embodiment is capable of calculating/updating the latest RTC drift value of the RTC. As a result, the processing module 110 may store a set of values corresponding to the time latching point into the non-volatile memory 120. For example, the latest RTC drift value, the clock value B1, the GNSS time C1 and maybe the clock value A1.

Referring to the right portion of FIG. 2, after the power-off period, the processing module 110 of this embodiment utilizes the time-latching logic circuit 150 to latch the two clock signals and then derive a clock value B2 of the RTC 140, and further performing GNSS time calculations according to the clock value B2 and the values stored in the non-volatile memory 120, such as the latest RTC drift value, the clock value B1, the GNSS time C1, in order to calculate at least a second GNSS time C2 as an initial value of the GNSS time after the power-off period of the GNSS receiver. Regarding the time-latching operation for deriving the aforementioned clock value B2, the clock value B2 of the RTC and a clock value A2 of the baseband time tick are read at the same latching point. As a result, the GNSS time C2 can be calculated by the following equation (1):

$$C2=C1+(B2-B1)-B_{bias} \qquad (1)$$

The $B_{bias}$ is the clock bias of the RTC clock signal between the clock values B1 and B2.

Please note that a first week number (WN) value WN1 of this embodiment is involved in order to assure the correctness of related calculations of the second GNSS value C2. According to different implementation choices of this embodiment, the first WN value WN1 may be not utilized for the related calculations of the second GNSS value C2 such as a second time of week (TOW) value TOW2, and may be stored not in the non-volatile memory 120, while a flag or a certain algorithm can be utilized for indicating whether the power-off period crosses a time point when the WN value of the GNSS time is increased.

Figure 3:
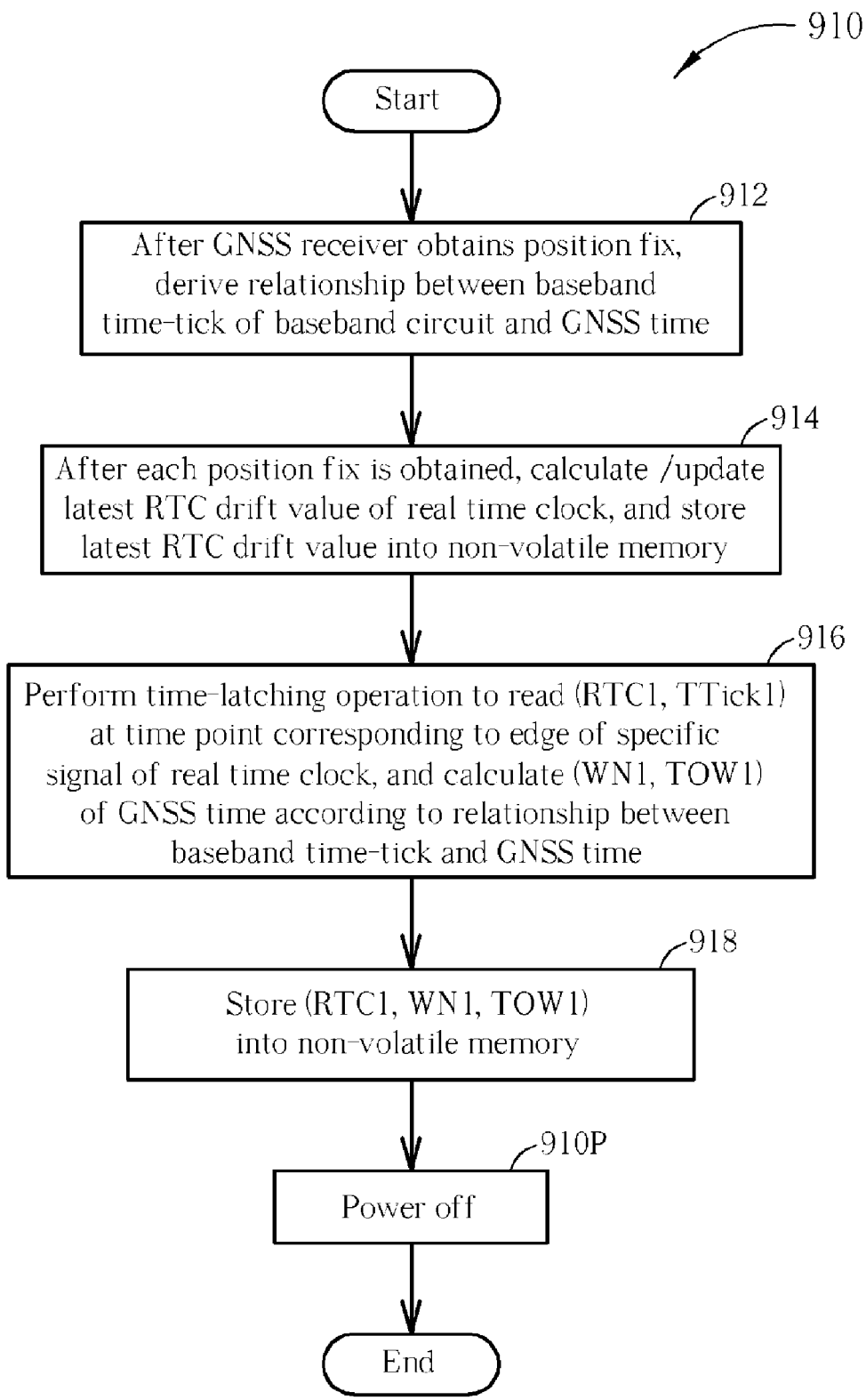
FIG. 3 is a flowchart of a first procedure of the method shown in FIG. 2, where the first procedure corresponds to a first time period that ends at a power-off time point shown in FIG. 2.

FIG. 3 further illustrates a flowchart of a first procedure 910 of the method shown in FIG. 2, where the first procedure 910 corresponds to a first time period that ends at the power-off time point shown in FIG. 2. The first procedure 910 of the method is described as follows.

In Step 912, after the GNSS receiver obtains a position fix, the processing module 110 derives the relationship between the baseband time tick of the baseband circuit 130 and the GNSS time. In this embodiment, as the GNSS time is accurate after the GNSS receiver obtains the position fix, the processing module 110 may simultaneously derive a specific time tick value TTick0 and at least one accurate value of the GNSS time to obtain the correct relationship between the baseband time tick and the GNSS time, where the aforementioned accurate value of this embodiment comprises a specific WN value WN0 and a specific TOW value TOW0.

In Step 914, after each position fix is obtained, the processing module 110 calculates/updates the latest RTC drift value of the RTC 140, and stores the latest RTC drift value into the non-volatile memory 120. Please note that the number of times that the GNSS receiver obtains a position fix before the power-off period may be greater than one, and the processing module 110 may calculate the latest RTC drift value more than once in order to update the latest RTC drift value that is stored in the non-volatile memory 120.

In Step 916, the processing module 110 controls the time-latching logic circuit 150 to perform a time-latching operation in order to read (RTC1, TTick1) (i.e. the first RTC value RTC1 and the first time tick value TTick1) at a time point corresponding to an edge of a specific signal of the RTC 140, such as the aforementioned oscillator signal whose frequency is typically around 32768 Hz. In Step 916, the processing module 110 further calculates (WN1, TOW1) of the GNSS time (i.e. the first WN value WN1 and the first TOW value TOW1) according to the relationship between the baseband time tick and the GNSS time. For example, in a first situation where the GNSS time remains within the same week, the WN value remains constant, so (WN1, TOW1) of the GNSS time can be calculated as the following equations (2) and (3):

$$WN1=WN0 \qquad (2)$$

$$TOW1=TOW0+(TTick1-TTick0) \qquad (3)$$

In another example, in a second situation where the GNSS time transits to the next week, the WN value should be increased with an increment of one, so (WN1, TOW1) of the GNSS time can be calculated as the following equations (4) and (5):

$$WN1=WN0+1 \quad (4)$$

$$TOW1=TOW0+(TTick1-TTick0)-604800 \quad (5)$$

where 604800 in the above equation represents the number of seconds in a week. Thus, in order to cover both of the two situations of the two examples mentioned above, the first TOW value TOW1 can be first calculated as mentioned in the first situation anyway, and if the first TOW value TOW1 is greater than or equal to 604800, the first TOW value TOW1 is then decreased with an decrement of 604800 and the first WN value WN1 is therefore increased with an increment of one; otherwise, the first TOW value TOW1 is correct, so WN1=WN0.

In Step 918, the processing module 110 stores (RTC1, WN1, TOW1) into the non-volatile memory 120.

In Step 910P, power off.

Please refer to FIG. 2 again. After the processing module 110 sends a command triggering the time-latching operation, the time-latching logic circuit 150 reads (RTC1, TTick1) at a time point corresponding to an edge of the aforementioned oscillator signal of the RTC 140, where the edge of this embodiment represents the end of a clock cycle of the oscillator signal. Please note that, for brevity, the time-latching operation performed in order to derive (RTC1, TTick1) in this embodiment can be described as time-latching (RTC1, TTick1), or simply described as latching (RTC1, TTick1).

In this embodiment, after receiving the command triggering the time-latching operation, the time-latching logic circuit 150 waits for the first detected falling edge of the oscillator signal and reads (RTC1, TTick1) at the time point corresponding to the first detected falling edge that appears after the command. Thus, (RTC1, TTick1) have the same resolution corresponding to the frequency of the baseband time tick.

According to a variation of this embodiment, after receiving the command triggering the time-latching operation, the time-latching logic circuit 150 waits for the first detected rising edge of the oscillator signal and reads (RTC1, TTick1) at the time point corresponding to the first detected rising edge that appears after the command. Thus, (RTC1, TTick1) still have the same resolution corresponding to the frequency of the baseband time tick.

Figure 4:
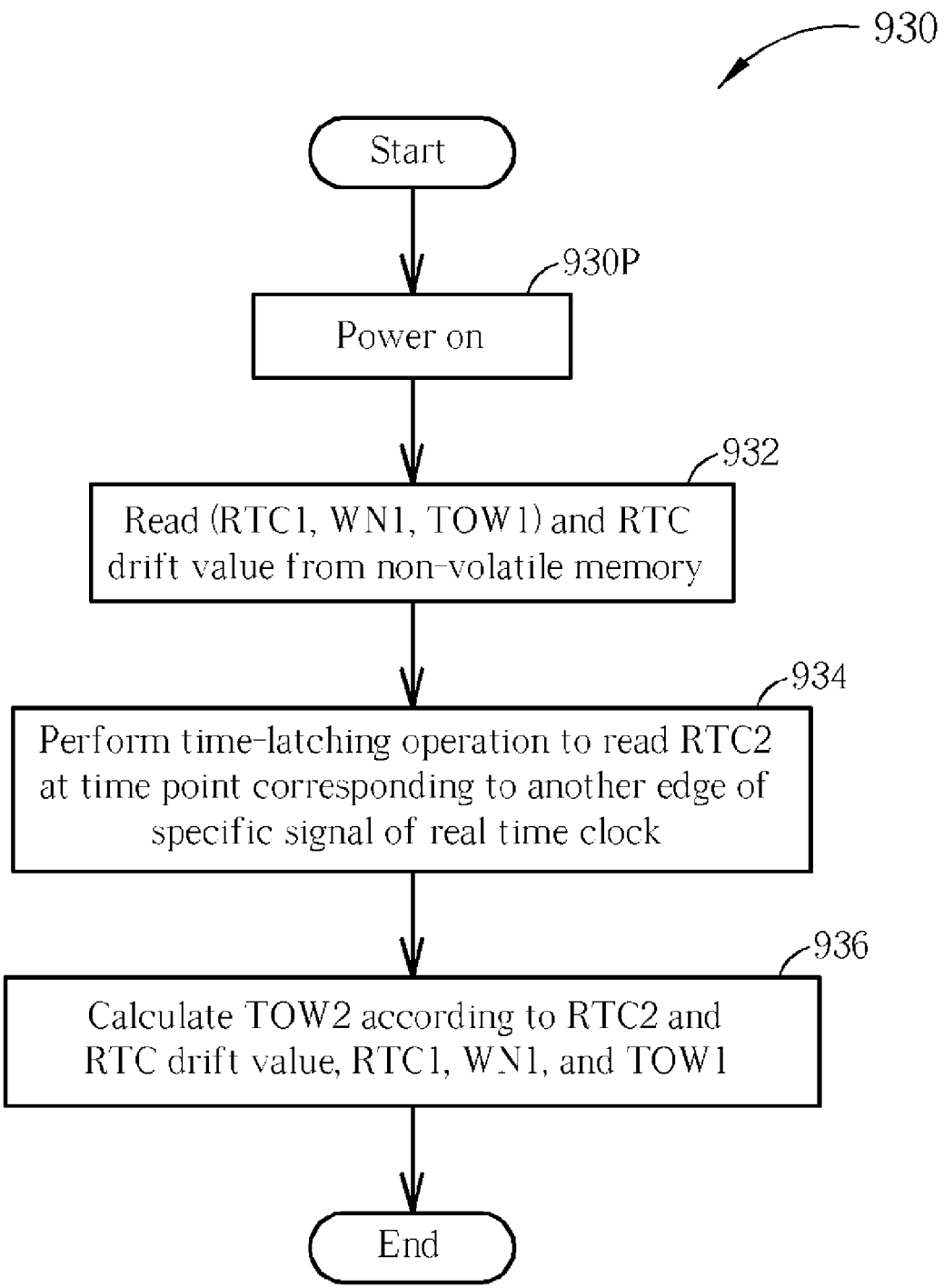
FIG. 4 is a flowchart of a second procedure of the method shown in FIG. 2, where the second procedure corresponds to a second time period that starts from a power on time point shown in FIG. 2.

FIG. 4 further illustrates a flowchart of a second procedure 930 of the method shown in FIG. 2, where the second procedure 930 corresponds to a second time period that starts from the power on time point shown in FIG. 2. The second procedure 930 of the method is described as follows.

In Step 930P, power on.

In Step 932, the processing module 110 reads (RTC1, WN1, TOW1) and the latest RTC drift value from the non-volatile memory 120.

In Step 934, the processing module 110 controls the time-latching logic circuit 150 to perform the time-latching operation to read the second RTC value RTC2 and a second time tick value TTick2 at a time point corresponding to another edge of the specific signal of the RTC 140, where the specific signal of this embodiment is the aforementioned oscillator signal.

In Step 936, the processing module 110 calculates the second TOW value TOW2 according to the second RTC value RTC2 and the values stored in the non-volatile memory 120, such as the latest RTC drift value, the first RTC value RTC1, the first WN value WN1, and the first TOW value TOW1. According to this embodiment, the processing module 110 first calculates an RTC bias value $RTC_{bias}$ according to the latest clock drift value that is stored in the non-volatile memory 120, and then calculates the second TOW value TOW2 according to the following equation (6):

$$TOW2=TOW1+(RTC2-RTC1)-RTC_{bias}; \quad (6)$$

where the RTC bias value $RTC_{bias}$ of this embodiment is equal to the product of the difference (RTC2−RTC1) and the latest clock drift value that is stored in the non-volatile memory 120.

According to a variation of this embodiment, the clock signal of the RTC 140 can be a derivative of the aforementioned oscillator signal, where the implementation of the present invention will not be hindered.

According to another variation of this embodiment, the processing module 110 is capable of updating the relationship after each position fix is obtained.

FIG. 5 illustrates some experimental results derived by utilizing the method shown in FIG. 2 with the temperature not changing rapidly. As shown in FIG. 5, referring to the lower two rows of the table, the RTC drift value is measured in "microseconds of drift per second" (μsec/sec), and the data in these two rows remains almost constant throughout the experimental results. Referring to the first data row under the header row within the table shown in FIG. 5, the initial GNSS time error is measured by comparing the initial value derived by utilizing the method shown in FIG. 2 with the exact GNSS time, and the data in this row satisfies the typical requirement of one millisecond or less. For example, in the situations where the power-off period is respectively equal to 1 second, 10 seconds, or 60 seconds (i.e. 1 minute), the initial GNSS time error is less than one microsecond. In addition, the situation where the power-off period is equal to 600 seconds (i.e. 10 minutes), the initial GNSS time error is less than two microseconds. Additionally, in the situation where the power-off period is equal to 3600 seconds (i.e. 1 hour), the initial GNSS time error is less than twenty-two microseconds.

In contrast to the related art, the present invention methods and apparatus have no leap second issue since the calculations according to the above embodiments are based on time differences of the RTC, rather than direct utilization of the RTC time.

It is another advantage of the present invention that the present invention methods and apparatus utilize the RTC time and the time-latching operation to recover an accurate initial value of the GNSS time after a power-off period with the resolution being in the order of nanoseconds, where the typical error of the initial value of the GNSS time is typically around the microsecond level when the power-off period is short.

It is another advantage of the present invention that the present invention methods and apparatus help subframe synchronization. As a result, when the GNSS receiver starts up, the Time To First Fix (TTFF) can be greatly reduced in contrast to the related art. Those skilled in the art will readily observe that numerous modifications and alterations of the device and method may be made while retaining the teachings of the invention.

What is claimed is:

1. A method for obtaining Global Navigation Satellite System (GNSS) time in a GNSS receiver, the method comprising:
    deriving a relationship between a first clock signal and the received GNSS time;
    latching a second clock signal and the first clock signal at a first latching point to obtain a clock value A1 of the first clock signal and a clock value B1 of the second clock signal;

calculating a GNSS time C1 corresponding to the clock value A1 according to the relationship;

latching the first clock signal and the second clock signal at a second latching point to obtain a clock value B2 of the second clock signal; and calculating a GNSS time C2 according to the GNSS time C1, the clock value B1, and the clock value B2.

2. The method of claim 1, further comprising:
powering off the GNSS receiver during the time period between the first latching point and the second latching point.

3. The method of claim 1, further comprising:
calculating the GNSS time C2 by the following equation:

$$C2=C1+(B2-B1)-B_{bias};$$

wherein the $B_{bias}$ is the clock bias of the second clock signal between the clock values B1 and B2.

4. The method of claim 1, further comprising:
calculating a clock bias between the clock values B1 and B2 of the second clock signal; and
calculating the GNSS time C2 according to the clock bias, the GNSS time C1, the clock value B1, and the clock value B2.

5. The method of claim 1, further comprising:
storing at least the clock value B1 and the GNSS time C1 into a memory.

6. The method of claim 1, wherein the relationship between the first clock signal and the GNSS time represents value mapping between the clock value of the first clock signal and the GNSS time.

7. The method of claim 1, further comprising:
updating the relationship after each position fix is obtained.

8. The method of claim 1, wherein the first clock signal has higher resolution than the second clock signal.

9. The method of claim 1, wherein the first clock signal is generated from a temperature compensated crystal oscillator and the second clock signal is generated from a real time clock signal.

10. The method of claim 1, wherein the edge represents the end of a clock cycle of the specific signal.

11. An apparatus for obtaining Global Navigation Satellite System (GNSS) time in a GNSS receiver, the apparatus comprising:

a first clock source for generating a first clock signal;

a second clock source for generating a second clock signal;

a time-latching logic circuit, coupled to the first clock source and the second clock source, for performing a time-latching operation to latch the first clock signal and the second clock signal at a first latching point in order to obtain a clock value A1 of the first clock signal and a clock value B1 of the second clock signal, and further latching the first clock signal and the second clock signal at a second latching point to obtain a clock value B2 of the second clock signal; and a processing module, coupled to the first clock source, a second clock source, and the time-latching logic circuit, for deriving a relationship between the first clock signal and the GNSS time, calculating a GNSS time C1 corresponding to the clock value A1 according to the relationship, and calculating a GNSS time C2 according to the GNSS time C1 and the clock values B1 and B2.

12. The apparatus of claim 11, wherein the GNSS receiver is powered off during the time period between the first latching point and the second latching point.

13. The apparatus of claim 11, wherein the processing module calculates the GNSS time C2 by the following equation:

$$C2=C1+(B2-B1)-B_{bias};$$

wherein the $B_{bias}$ is the clock bias of the second clock signal between the clock values B1 and B2.

14. The apparatus of claim 11, wherein the processing module calculates a clock bias between the clock values B1 and B2 of the second clock signal and calculates the GNSS time C2 according to the clock bias, the GNSS time C1, the clock value B1, and the clock value B2.

15. The apparatus of claim 11, wherein the apparatus further comprises a memory; and the processing module stores at least the clock value B1 and the GNSS time C1 into the memory.

16. The apparatus of claim 11, wherein the relationship between the first clock signal and the GNSS time represents value mapping between the clock value of the first clock signal and the GNSS time.

17. The apparatus of claim 11, wherein the processing module is capable of updating the relationship after each position fix is obtained.

18. The apparatus of claim 11, wherein the first clock signal has higher resolution than the second clock signal.

19. The apparatus of claim 11, wherein the first clock signal is generated from a temperature compensated crystal oscillator within the first clock source, and the second clock signal is generated from a real time clock signal of the second clock source.

20. The apparatus of claim 11, wherein the edge represents the end of a clock cycle of the specific signal.

* * * * *